United States Patent [19]
Keith

[11] 4,389,440
[45] Jun. 21, 1983

[54] TORQUE PRELOADED ELASTIC COVER FOR TORQUE COUPLING

[75] Inventor: Roger H. Keith, White Bear Lake, Minn.

[73] Assignee: Minnesota Mining & Manufacturing Company, St. Paul, Minn.

[21] Appl. No.: 346,574

[22] Filed: Feb. 8, 1982

[51] Int. Cl.³ .......................... H01B 7/00; B23P 19/02
[52] U.S. Cl. ...................................... 428/36; 174/135; 29/235; 29/450; 411/909
[58] Field of Search .............. 428/36; 174/135, 138 F; 29/235, 450; 411/372, 909

[56] References Cited

U.S. PATENT DOCUMENTS

| | | | |
|---|---|---|---|
| 3,515,798 | 12/1968 | Sievert | 174/135 |
| 4,070,746 | 1/1978 | Evans et al. | 29/235 |
| 4,300,328 | 11/1981 | Carlsen | 29/235 |
| 4,338,970 | 7/1982 | Krackeler et al. | 174/135 |

FOREIGN PATENT DOCUMENTS 1053602 3/1959 Fed. Rep. of Germany ...... 174/135

*Primary Examiner*—William R. Dixon, Jr.
*Attorney, Agent, or Firm*—Cruzan Alexander; Donald M. Sell; John C. Barnes

[57] ABSTRACT

An elastic cover for couplings or splices comprising a radially stretched and axially twisted elastic cover supported on a core of spirally wound polymeric material which is progressively removed from within the cover member as a continuous narrow strip.

6 Claims, 4 Drawing Figures

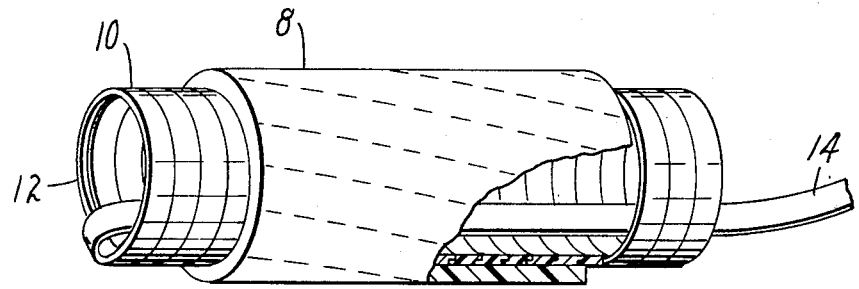
Fig. 1
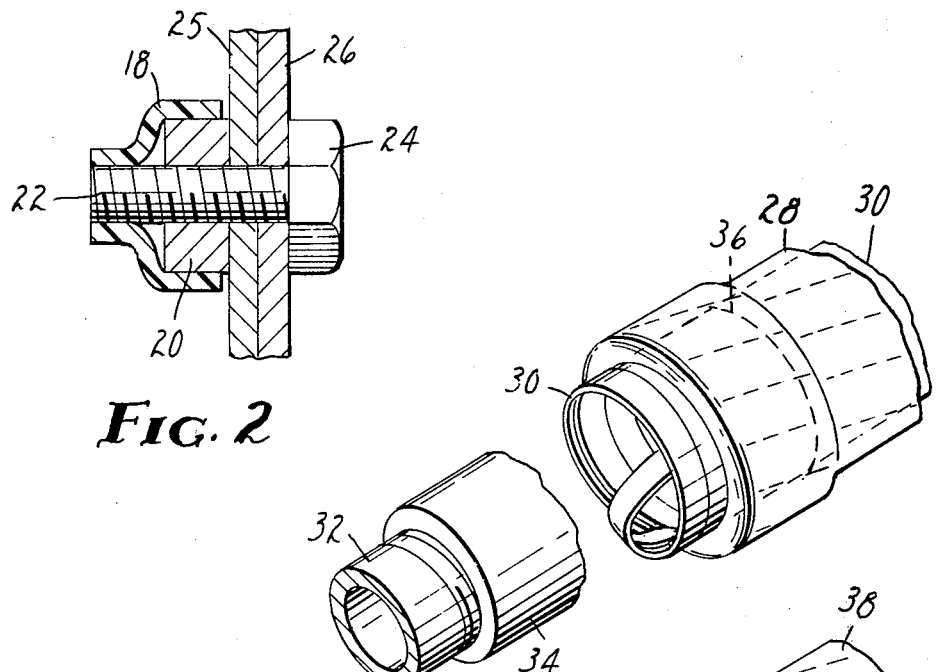
Fig. 2
Fig. 3
Fig. 4

TORQUE PRELOADED ELASTIC COVER FOR TORQUE COUPLING

DESCRIPTION

1. Technical Field

This invention relates to an elastic tubular cover member for covering couplings or joints between members coupled or uncoupled by relative rotation. The cover member of this invention will provide abrasion and corrosion-resistance, restrict leaks, and restrict relative movement of the members affording a loosening or uncoupling of coupling or joint by maintaining a torsional force on the coupled members.

2. Background Art

Conventional couplings secured by relative rotation of two coupling members, e.g., threaded couplings or bayonet couplings may be secured or staked to restrict unwanted loosening or uncoupling by mechanical means such as lock wires, lock washers, cotter keys, spring latches, or shrink wraps. Alternatively, they may be bonded by cements, glues, staking lacquers, etc. This is particularly applied to couplings subjected to vibrations and where the protection is critical such as on aircraft and earth working equipment. Such mechanical locking procedures utilize readily replaceable parts so tampering is not recognizable and adjustment can be made unnoticed. Further, no protection against abrasion or corrosion is provided.

The present invention provides an improvement over known protective devices and commercially available elastically shrinkable cover members which are constructed to be shrunk down or relaxed to form a closely conforming protective covering on couplings and joints. Prior protective cover members are disclosed in U.S. Pat. No. 3,515,798, issued June 2, 1970, and assigned to the assignee of this application. This patent discloses a cover member of highly stretched elastic material supported on a core which was helically grooved along its entire length such that the core could be progressively withdrawn from within the elastic tube to allow the same to shrink back onto and closely conform to the member disposed within the core. This patent also describes earlier examples of coverings used for sleeves and as protectors for splices.

The present invention provides an improvement in that the elastically shrinkable tubular cover member is prestressed torsionally on the core to form a twist in the prestretched sleeve such that it will not only form a seal which is elastically held in place radially but will apply a torque on the coupling about an axial direction to exert a force which will restrict relative rotation and axial movement in the uncoupling direction between the relatively rotatable members.

DISCLOSURE OF INVENTION

The present invention provides an improved elastic cover for couplings and comprises an elastic tubular cover member having an axial twist applied thereto and being supported in a highly stretched twisted condition on a hollow core member. The core member comprises a rigid cylindrical core of tough flexible polymeric ribbon material which is spirally wound and tacked or bonded to form a substantially rigid closed helix such that upon pulling one end of the ribbon it can be unwound and progressively removed from within the elastic member. The cover member has the axial twist applied to at least a portion thereof between the ends by counter-rotation of the opposite ends of the members before the member is placed on the core or the cover member may be twisted by imparting a torsional force on the member as it is progressively placed on the core, placing one end on the core and turning the same until the portion of the member having the twist is placed on the core.

BRIEF DESCRIPTION OF DRAWINGS

The present invention will be more fully described with reference to the accompanying drawing wherein:

FIG. 1 is a perspective view of an elastic cover constructed in accordance with the present invention and partially in section to show the construction of the core, and partially diagrammatic to illustrate the twist;

FIG. 2 is a sectional view of a cover constructed according to the present invention positioned over a threaded bolt and nut;

FIG. 3 is an exploded view of a cover of the present invention being positioned over a pipe coupling; and FIG. 4 is an illustration of a cover member being placed over a bayonet-type coupling.

BEST MODE FOR CARRYING OUT THE INVENTION

The present invention provides an improved rubbery or elastically shrinkable tubular cover member 8 supported in radially expanded or stretched and axially twisted condition on a removable hollow cylindrical core 10.

The drawing illustrates the cover member of the present invention and the cover member positioned over a threaded nut on a threaded bolt, its suitability as a torque-exerting pressure retaining seal and protective cover for a pipe joint, and as a coupling retaining seal and protective cover for a bayonet-type coupling.

The cover member may be formed of compounded synthetic rubbers or other elastomers, examples include neoprene, silicone elastomers or ethylene propylene copolymers. By the term compounded is meant normal conventional operations in which ingredients are added to provide the required processing behavior and physical properties of the elastomeric device. Processing could entail open mill or internal mixing, extrusion, steam autoclave or continuous vulcanization or molding techniques. In keeping with conventional preparation of such elastomeric materials, typical process aids, process oils, coupling agents, and vulcanizing agents (if necessary) are included in the compounded elastomeric component.

Typically the elastic cover is expanded to afford a stretch ratio of 1 to 1.2 up to 1 to 4, and the cover has its ends rotated relative to each other through an angle representing a pitch of 0.05 to 1 turn in a length of the cover equal to the cover diameter in the stretched condition. For these reasons the rubbers should be compounded as known in the art to increase cut and tear resistance, and have a minimum of permanent set. Permanent set is a measure of the elastic memory of a cured elastomer. Excellent elastic memory will typically allow a long lived continuous shrink force when the article is applied. This property, in combination with a high stretch ratio, will allow coverage of a broad range of coupling diameters with a minimum number of sizes of prestretched articles. For adequate sealability and optimum product versatility, the permanent set should not exceed about 30 percent. To ascertain permanent set, a sample is subjected to a preselected strain at a specified temperature for a period of time, and released, whereupon the distance (diameter, length, etc.) that is unrecovered can be measured. The conditions herein involve stretching the specimen 100 percent for 22 hours at 100° C., following which the samples are allowed to equilibrate for one hour at room temperature. The samples are then released, and after a 30 minute recovery period, are measured.

The core 10 is formed of a tough polymeric material such as tough flexible cellulose acetate butyrate, polyvinyl chloride, or polypropylene. The core is formed by spirally wrapping an extruded ribbon 12 having stepped edges as shown in section in FIG. 1. Upon wrapping the ribbon it is fused or tacked at spaced points along the edges to form a rigid core for supporting the stretched covers 8. The core 10 is removed from the cover member by pulling on the free end 14 of the ribbon, disposed within the core and extending from one end, with sufficient force to separate the ribbon where tacked such that the core may be unwound permitting the cover to relax onto the coupling, leaving the cover tightly affixed over the members of the coupling. The material and the manner in which the ribbon is fused determines the separation forces required but, the core must maintain its integrity to prevent premature collapse of the structure.

The ribbon 12 may have various widths and thicknesses to provide cores of varying inside diameter. Examples of the same are given in the table below.

| Width (in.) | Thickness (in.) | Inside Diameter (in.) |
|---|---|---|
| .232 | .040 | .46–1.07 |
| .232 | .050 | 1.30–1.72 |
| .360 | .060 | 1.50–2.40 |
| .360 | .075 | 2.60–4.50 |
| .618 | .090 | 3.87–5.00 |

Illustrations of the elastic covers 8 in the radially relaxed state are

| Inside Diameter (in.) | Wall Thickness (in.) |
|---|---|
| .14 | .16 |
| .19 | .12 |
| .24 | .15 |
| .30 | .24 |
| .32 | .16 |
| .37 | .14 |
| .42 | .17 |
| .50 | .18 |
| .60 | .18 |
| .84 | .18 |
| .96 | .18 |
| 1.20 | .22 |
| 1.50 | .22 |

As the cover 8 is placed onto the coupling a seal and torsional force is also applied between the relatively rotatable parts in a direction to tighten or lock the coupling.

As illustrated in FIG. 2, a cover 18 has been placed over a threaded nut 20 and the extended threaded end 22 of a bolt 24 holding two plates 25 and 26 together. The cover 18 has an axial twist which places a force on the nut 20, tending to twist it in the clockwise locking direction as the elastic memory of the cover tends to straighten the cover which is tightly gripping the nut 20 and threaded end 22 of bolt 24.

In FIG. 3, cover 28 on a core 30 is positioned over one of the pipes to be coupled and is moved over a coupling between a threaded pipe 32 and the coupler 34 or other pipe. The cover 28 and removable core 30 can be moved along the pipe, over the coupling and permitted to relax onto the pipe and coupler to grasp tightly thereto. A fold 36 in one or both ends of the cover 28 increases the sealing capacity of the cover over pressurized couplings. The twist in the cover restricts relative movement between the pipe 32 and coupler 34 in a direction to loosen the joint.

Seals formed by covers having inwardly folded ends placed on unsealed unadhered galvanized pipe have proved to successfully maintain air or grease pressures in the range of 8 to 12 psi. This sealing results since the internal pressure moving along the cover from the spliced point toward the end of the cover reaches the inward fold 36, and then follows a path along the cover between the fold and the end of the cover. The pressure between the fold and the cover then increases the seal by pressing the folded end more tightly to the tube and overcoming the tendency to expand the end of the cover. This expanding tendency is responsible for a catastrophic loss of pressure at 6 to 8 psi for prior art cover members. The cover with the folded end is described and claimed in copending application Ser. No. 293,675, filed Aug. 17, 1981 and assigned to the assignee of this application. The disclosure therein is incorporated herein by reference.

There are uses for covers which utilize the folded pressure retaining fold 36 at only one end and the other end has no fold but is adapted to be secured by a suitable external clamp such as the normal hose clamp. That being so, the product may be made with the cover member 28 folded inwardly at only one end and disposed on the core 30. The twist in the cover adapts it as a locking member on the coupling or splice enclosing members.

In FIG. 4 there is illustrated a cover 38 on a core 40 formed of a ribbon 42, which cover is radially stretched and axially twisted and is positioned over a shaft 44 having an end socket 46 adapted to receive axially therein, against a spring, the end 48 of a second shaft 49 having radially extending trunnions 50 to be received and locked in the socket 46. The core 40 will then be moved to a position over the secured coupling, and by pulling the free end of the ribbon 42, the cover 38 will tightly grasp the socket 46 and shaft 49 and apply a torsional force on the two to restrict axial and counterclockwise rotation of shaft 49 in relationship to the socket 46.

Other uses for the elastomeric stretched and twisted cover, affording environmental protection and prevention of disengagement, include but are not limited to screwed cable fittings, knurled or hex nuts on flanged, flared or ferruled fittings, bayonet or screwed lamp bases, electrical sockets or fuses, glands for faucets or valves and other mechanical couplings or splices.

Similarly, it can be seen by those skilled in the art that covers can be provided to expand into position to serve as a protective member for an internal couping, etc.

Having described the invention, what is claimed is:

1. An elastic cover assembly for couplings or splices completed by rotational movement between the members comprising an elastic tubular cover member having an axial twist formed between the ends of the member with said member supported in a radially stretched condition on a hollow core member comprising a tough flexible material formed as a substantially rigid tube which can be collapsed and removed, allowing the cover to relax tightly about a coupling or splice without loss of the twist.

2. An elastic cover assembly according to claim 1 wherein said cover member has an axial twist with the ends offset by 0.05 to 1 turn per diameter of the cover along the length thereof.

3. An elastic cover assembly according to claim 1 or 2 wherein said core member is a spirally wound ribbon to form a cylinder having an inside diameter between 0.46 inches and 5.0 inches.

4. An elastic cover assembly according to claim 1 wherein said core member is formed of a ribbon of cellulose acetate butyrate, polyvinyl chloride, or polypropylene.

5. An elastic cover assembly according to claim 1 wherein said cover member has at least one end folded inward.

6. An elastic cover according to claim 1 or 5 wherein the entire cover member is supported on said core member.

* * * * *